Figure 3:
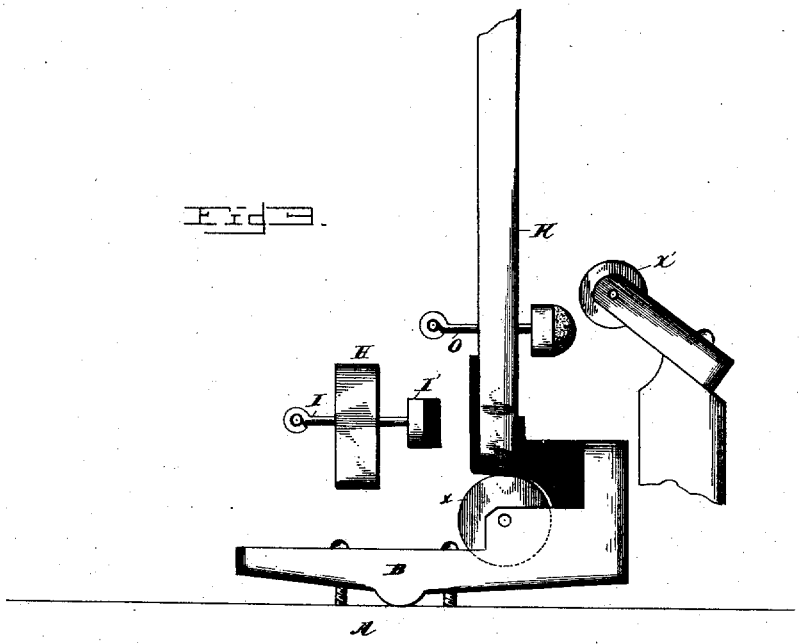

2 Sheets—Sheet 1.
S. R. PERRY.
PIANO FORTE ACTION.
No. 11,138. Reissued Jan. 6, 1891.
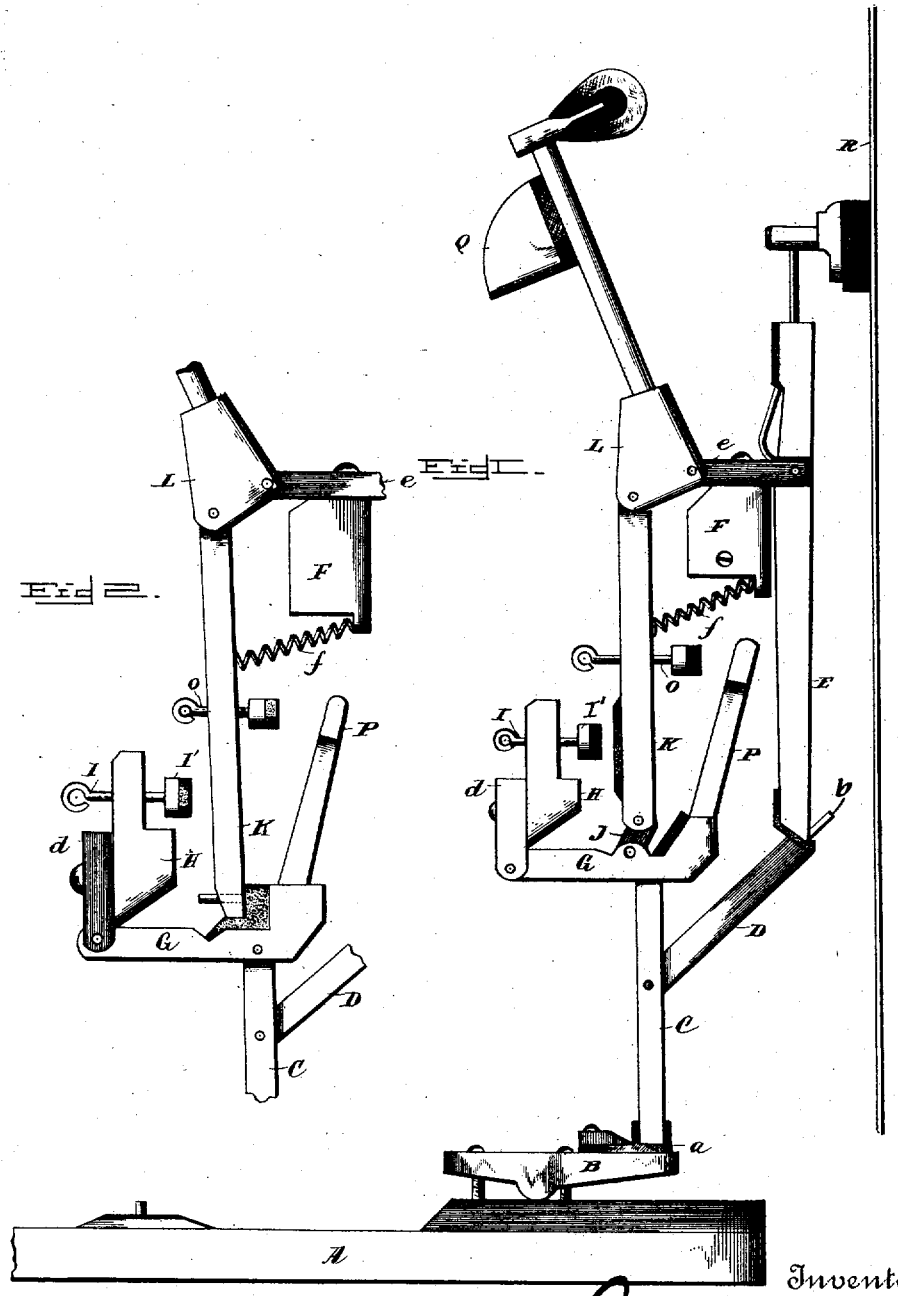
Witnesses
Paul W. Stevens
Mercer Myers
Inventor
Samuel R. Perry
By Myers & Co
Attorneys.
THE NORRIS PETERS CO., PHOTO-LITHO., WASHINGTON, D. C.

2 Sheets—Sheet 2.

S. R. PERRY.

PIANO FORTE ACTION.

No. 11,138. Reissued Jan. 6, 1891.

Witnesses
Paul W. Stevens
Mercer Myers

Inventor
Samuel R. Perry
By Myers & Co
Attorneys.

THE NORRIS PETERS CO., PHOTO-LITHO., WASHINGTON, D. C.

UNITED STATES PATENT OFFICE.

SAMUEL R. PERRY, OF SCRANTON, PENNSYLVANIA.

PIANO-FORTE ACTION.

SPECIFICATION forming part of Reissued Letters Patent No. 11,138, dated January 6, 1891.

Original No. 406,405, dated July 2, 1889. Application for reissue filed August 19, 1890. Serial No. 362,447.

*To all whom it may concern:*

Be it known that I, SAMUEL R. PERRY, residing at Scranton, in the county of Lackawanna and State of Pennsylvania, have invented certain new and useful Improvements in Piano-Forte Actions; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to piano-forte actions, parts of which may be applied to horizontal or upright actions, with slight modifications to suit the position of each style. It has for its object, first, to cheapen the construction thereof by dispensing with several parts usual to other forms of piano-actions—viz., the rigid flange usually fastened to the bottom or actuating lever, the wire and back check screwed into the actuating-lever, and the back-check arm usually extending from the hammer-butt. I also dispense with the bridle wire and tapes and the regulating-rail and its screws, which operate to throw off the jack with its reacting-spring; secondly, to make it more responsive to the touch, producing a better repetition of stroke in rapid execution; thirdly, to make each stroke a mechanical certainty by having each and every part directly connected one to the other without intermediates, such as arms or posts, and, fourthly, to make a more durable and wearable action, and one that will require less labor and frequency of adjustment.

To these ends the nature of the invention consists of the combination of parts, including their construction, substantially as hereinafter fully described and claimed.

In the accompanying drawings, Figure 1 illustrates a view in side elevation of my improved piano-forte action. Fig. 2 is the same so far as the long link, operating-post buffer, and reacting-spring are concerned, excepting only the short link attachment; Fig. 3, the same again, with the addition of the rollers to be used instead of operating-post and buffer.

In constructing my invention I employ, in connection with the key A, as is usual, a regulating-block B, which is an intermediate for regulating dip of the key by means of the screws to operate the tilting of block B, common to all actions.

C is a pitman-rod flexibly connected or jointed to the inner end of the key by means of the block B. (Shown by *a*, in this case a leather hinge.)

In a slot in the pitman-rod C is pivoted the outer or lower end of an arm D, the inner or upper end of the arm having thereon a pin or projection *b*, which enters an aperture in the lower end of the damper-lever E. From this it will be seen that when the key A is pressed upon it will cause arm D to force the damper away from the piano-string to allow free vibration of string while the key is held in its depressed position, the damper-lever E having the usual pivotal connection with the piano-forte-action rail F. The pitman-rod C is pivoted at its upper end to the horizontal bar or actuating-lever G, intermediately of the ends of said bar. The outer end of actuating-lever G is pivoted in the slotted lower end of an arm or flange *d*, applied to rail H of the piano-forte. The rail H also supports a regulating check-screw I, having a cushioned block I′, the functions of which will appear farther on.

To the actuating-lever G is connected directly and without any intermediate posts, key-rocker, or other parts the short flexible link J, which in turn is connected to the lower end of a long link K, which long link is directly pivoted to the hammer-butt L.

The hammer-butt L may be pivoted to a flange *e* of the rail F or otherwise secured and held firmly in position. It will be seen that I thus form a direct and perfect connection between the actuating-lever G and the hammer-butt L, also between the key-rocker B and the actuating-arm G.

Upon the arm or actuating-lever G, I place a post P, rigidly secured thereto, the office of which is to act upon the long link K by striking the buffer *o*, passing through the same, which buffer is adjustable by means of its regulating-screw. It will also be seen that the links J and K from their direct connections with the actuating-lever G and the hammer-butt L, and by means of the rigid post P acting against the long link K, enable me to dispense with several parts usual to all other forms of piano-forte actions. They combine the offices of the jack, check-damper tapes or bridles, and check-damper wires, which are all dispensed with in my actions.

To the rail F is suitably connected at one end the spring *f*, the opposite end of which is fastened to long link K, so as to react upon the links J and K in bringing them into position for another stroke in playing the same.

The operation is as follows: When the key A is pressed by the finger, it acts upon the pitman-rod C or actuating-arm G, as the case may be. Simultaneously the links K and J are lifted, moving the hammer away from the hammer-rail Q and throwing it against the string R. As the hammer comes within a short distance of the string, the short link J is carried outward beyond the aforesaid perpendicular line by means of the rigidly-secured post P coming in contact with the regulating-block O, throwing the link K against the regulating-block *l'*, and thus holding the long link K firmly with the hammer in the desired position, the hammer having been made free by unlocking the short link J by means of the post P. The regulating-screws O and I are for adjusting the distance between the hammer and the piano-string, while the spring *f* has the office of bringing the links K and J into their first positions after the pressure is removed from the key A. As the short link J is intended to unlock the hammer where desired, it is pivotally attached to the lower end of the long link K and to the actuating-lever G, so as to cause the parts to move freely and rapidly when the post P comes into indirect contact with the long link K in unlocking the same in striking the buffer O. I do not, however, confine myself to this as the only method of carrying out my use of the long and short links directly connected with the hammer-butt L and actuating-lever G.

In the above-referred-to Fig. 2 I have shown a cushioned seat applied to the lever G for the link K to rest upon and a pin passing through the lower part of the link to steady its motion, in order to show how post P may act in this form of action to press the link K and cause it to slide off, and thus unlock the link and free the hammer at any desired point, as before mentioned, in the capacity of the ordinary jack.

In Fig. 3 I show another variety of the same mode of disconnecting or unlocking the link K by means of a pulley X pivoted within the regulating-block B, so as to have the link K roll over the center or pivot at the proper time, when the regulating-screw O may come in contact with a similar pulley X, secured to a rail, as shown.

Having thus fully described my invention, what I claim, and desire to secure by Letters Patent of the United States, is—

1. In a piano-forte action, the short link J, connected directly to the actuating-lever G, and the long link K, said long link K in turn connected directly to the hammer-butt L, as and for the purposes specified.

2. The post P, rigidly attached to the actuating-lever G and combined with the links J and K, for the purposes named.

3. The link J, connected directly to the actuating-lever G, and the long link K, said long link being connected directly to the hammer-butt L and provided with a regulating-screw, and buffer *o*, adapted to engage the rigid post P, in the manner and for the purpose substantially as shown and described.

4. The links J and K, connecting directly the hammer-butt L and actuating-lever G, in combination with spring *f*, for the purpose named.

5. The links J and K, connecting directly the hammer-butt L and actuating-lever G, in combination with the rigid post P, pitman C, arm D, and key-rocker, in the manner and form stated.

6. The links J and K, connecting directly the hammer-butt L and actuating the lever G, in combination with rail H, regulating-screw I, and its buffer, adapted to engage the long link K and check the same, in the manner and for the purpose stated.

7. The links J and K, connecting directly the hammer-butt L and the actuating-lever G, the long link K, provided with a regulating-screw and buffer O, adapted to engage the post P, in the manner and for the purpose specified.

8. The actuating-lever G, routed upon its upper side and adapted to receive the short link J, in the manner specified.

In testimony whereof I affix my signature in the presence of two witnesses.

SAMUEL R. PERRY.

Witnesses:
J. R. PERRY,
D. L. O'NEILL.